Dec. 1, 1931.  E. BREUIL  1,834,045
WATER SOFTENER
Filed July 28, 1928
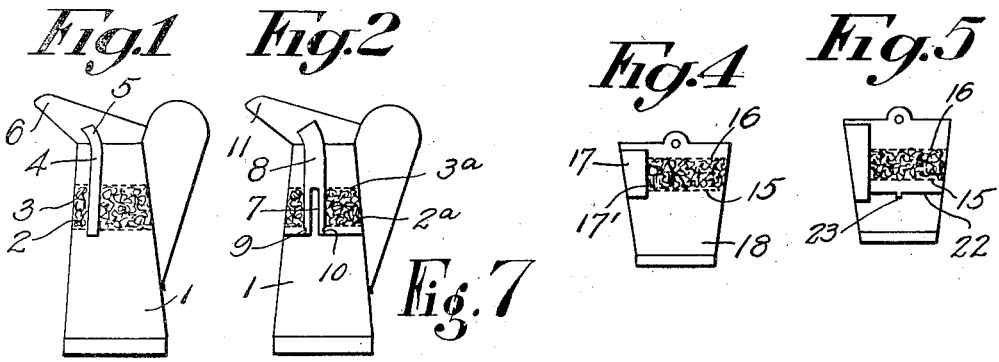
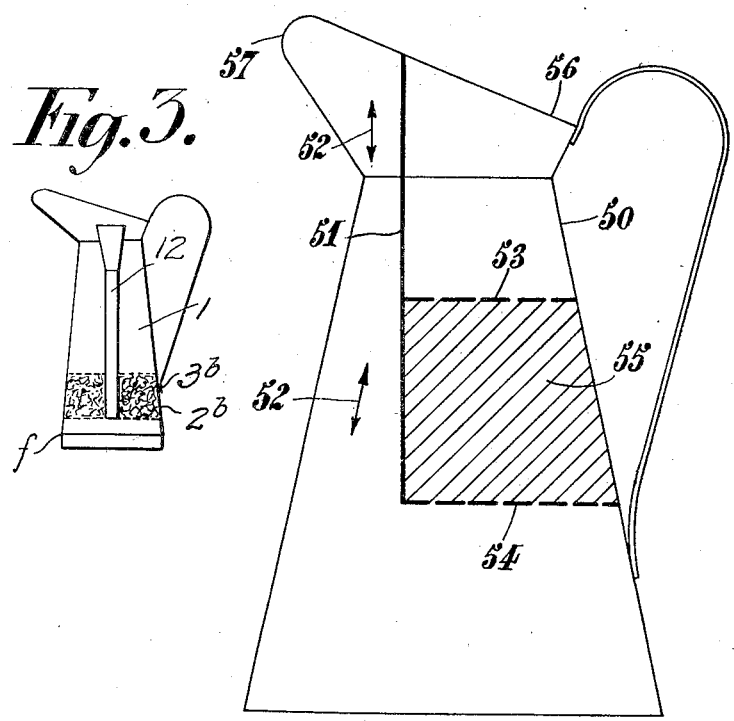
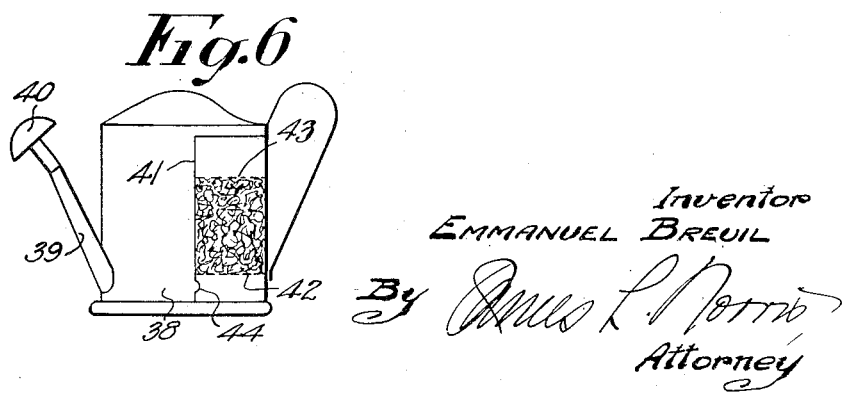
Inventor
EMMANUEL BREUIL
By
Attorney Patented Dec. 1, 1931

1,834,045

UNITED STATES PATENT OFFICE

EMMANUEL BREUIL, OF PARIS, FRANCE, ASSIGNOR TO ETABLISSEMENTS PHILLIPS & PAIN, SOCIÉTÉ ANONYME, OF PARIS, FRANCE, A JOINT-STOCK COMPANY OF FRANCE

WATER SOFTENER

Application filed July 28, 1928, Serial No. 295,994, and in France August 5, 1927.

The present invention relates to water softening vessels, the water being softened, in known manner, through the medium of base exchanging substances. Up to the present the softening of calcareous waters by means of base exchanging substances has been accomplished by means of filters equipped with the necessary taps and connected to water supply piping, or else fed by hand by means of any suitable receptacles.

The object of the present invention is to suppress these fixed or movable filters, notably for domestic purposes, and to enable the water to be softened in the utilizing vessels themselves such as jugs, pails, pots, watering-cans, bottles and the like . . . whether these vessels be of any particular shape or not, in such manner that they need only be filled with ordinary water taken from the tap or a pump and then turned over in order to cause the softened water to flow out immediately in the customary manner. It is obvious that the water will be softened in the vessels until the base exchanging substance is saturated, but it is also obvious that, when the base exchanging substance is saturated, it will only be necessary to regenerate it so as to obtain anew further bucketfuls or jugfuls of softened water.

To this effect, the water softening vessel according to the invention is essentially characterized by the fact that a chamber containing softening material is located therein in such manner that the water to be softened flows through it either when filling the vessel or when emptying the same, or again at both these junctures and that the softened water can be poured out by turning the vessel upside down.

Various embodiments of the invention have been represented diagrammatically and merely by way of example on the annexed drawing in which:

Figs. 1 to 3 are diagrammatic views in sectional elevation of various embodiments of a jug adapted in conformance with the present invention.

Figs. 4 and 5 are similar views to those of Figs. 1 to 3 but representing a bucket.

Fig. 6 is a sectional elevation of a watering-can modified in conformance with the present invention.

Fig. 7 shows a modification.

Turning now to the drawing and in particular to Figs. 1 to 3, a current form of jug 1 has been illustrated, modified in accordance with the invention to enable the water in said jug to be softened directly and immediately.

In Fig. 1, the jug 1 has two perforate transverse walls 2 and 3 secured by any suitable means within said jug 1, the space bounded by the two perforate walls 2 and 3 being filled with any suitable base exchanging substance permeable to water. A pipe 4 the upper end 5 of which is curved in the direction of the spout 6 of the jug 1 extends through the two walls 2 and 3. The jug thus formed constitutes a water softening jug.

The action of the jug is as follows: When the jug 1 is filled in the customary manner, the water entering said jug permeates through the softening material secured between the perforate walls 2 and 3 and is softened during its passage through said softening material. When the jug is full, the water contained therein has been completely softened and is ready for the usage for which it is to be put. In order to transfer the water from the jug 1 into any other vessel, it is only necessary to incline the jug 1 in the customary manner, the water contained in said jug issuing out either through the pipe 4 and the spout 6 or directly through the spout 6 passing again in the opposite direction through the softening material maintained between the walls 2 and 3. In either case, the water flowing out is softened, and in the second case a more thorough softening of the water is obtained, since the water flows a second time through the softening material.

When the softening material has served to soften several jugfuls of water, it must be regenerated. For this purpose, the jug is filled with water in such manner that the pipe 4 be wholly submerged, and a certain weight of salt (sodium chloride) is then placed on the wall 3. The salt rapidly dissolves. On account of its high density, the salt water sinks and causes the lighter water to rise through the pipe 4 which returns to the upper part of the wall 3 where it completes the dissolution of the salt. A circulation of water is thus set up in the jug 1. Only a few minutes are necessary for the salt to be completely dissolved. The jug is then emptied out and then replenished in order to rinse out the softening material and, finally, such rinsing water is poured off. The softening material is then in a regenerated condition and it can be used again in order to obtain a certain number of jugfuls of soft water.

Instead of regenerating the softening material in the above mentioned manner, such regeneration can be achieved by first of all introducing the salt into the jug 1 above the perforate wall 3 and by then slowly filling the jug 1 in order to dissolve the salt. When the jug is full, it is only necessary to empty it and replenish it so as to rinse the material, to pour off this rinsing water and to refill the jug in order to obtain soft water.

Figs. 2 and 3 simply illustrate modified forms of construction of the jug shown in Fig. 1 which has been described in detail.

In the case of Fig. 2, the jug 1 still includes two perforate walls $2^a$ and $3^a$ but it includes furthermore two concentric pipes 7 and 8, the outer pipe 8 being secured to an imperforate partition 9 fixed to the inner walls of the jug 1 and placed below the lower wall $2^a$. In addition, the pipe 8 is provided at its base with perforations 10 through which it communicates with the inner part of the jug situated above the partition 9. The object of this arrangement is to ensure as close a contact as possible between the softening material and the water to be softened.

The action of this jug is as follows: The water which has been poured into the jug in the customary manner, passes through the softening material contained between the walls $2^a$ and $3^a$, then falls onto the upper face of the partition 9 and enters the pipe 8 through its perforations 10. On reaching a fairly high level in the pipe 8 the water enters the tube 7 and from thence falls into the lower part of the jug. On emptying the jug, the softened water flows out through the pipes 7 and 8 and through the spout 11 of the jug 1.

In the jug illustrated in Fig. 3, the water is admitted into jug through a vertical tube 12 the base of which is secured to the lower perforate wall $2^b$. It ensues that the water which is admitted into the jug through this pipe 12 passes through the softening material contained between the walls $2^b$ and $3^b$ rising in the direction of the arrows $f$. In this case, for the regeneration of the softening material, the salt as well as the rinsing water are likewise admitted through the pipe 12.

When the vessel takes the form of a pail, as has been illustrated in Figs. 4 and 5, the softening material is, as in the case of the jugs, contained between two perforate walls 15 and 16.

In Fig. 4, these walls 15 and 16 are arranged in similar manner to the walls 2 and 3 of the jug illustrated in Fig. 1, the water flowing out of the pail through a passage 17 formed within the paid 18 by a partition $17^1$.

Fig. 5 shows a pail adapted in similar manner to that of Fig. 4 save that, in the case of Fig. 5, an imperforate plate 22 is provided below the wall 15, said imperforate plate having an orifice 23 of small diameter through which flows the water passing through the softening material contained between the walls 15 and 16. The effect of this arrangement is to retard the water flow through the softening material and, by ensuring a more protracted contact of the water to be softened with the softening material to ensure a more thorough softening of the water.

Naturally, in order to fill the various pails shown and briefly described, the water must be passed through the softening material.

By way of example, a watering can 38 has been illustrated in Fig. 6 likewise enabling the water to be softened straight away. This watering can 38 is adapted in similar manner to the jug 4 whilst the water flows out through the spout 39 with or without a rose 40. Naturally on filling the watering can, the water must first be made to enter the pipe 41 disposed within the can, in order that such water shall pass through the softening material contained between the perforate walls 42 and 43 of the pipe 41, the softened water finding its way into the can through perforations 44 provided at the base of the pipe 41.

From the preceding description, it will be noted that the water is softened in the vessel itself into which it is poured.

It will be noted that in the various embodiments of the vessels including a pipe for admitting the water into these vessels, this pipe must lie below the upper level of the vessel so that it can be wholly submerged. This is necessary in order to set up in the vessel the circulation of the water to which reference has been previously made and whose purpose it is to enable the softening material to be thoroughly softened.

In connection with the regeneration, a useful purpose is served by raising the softening material, by washing it with a current of ascending water, and with this aim in view, according to a modified form of embodiment of the invention, the duct or pipe which bypasses the softening material chamber rises above the lowest level of the upper edge of the receptacle so that the water conducted down through the duct or pipe passes directly under the softening material chamber, rises up through it and makes its way out by overflowing the upper edge of the receptacle.

This form of embodiment has been illustrated diagrammatically in Fig. 7 wherein the receptacle 50 is in the form of a jug or pitcher. It accommodates a vertical partition 51 forming a duct 52. The chamber 55 for the softening material is formed between two horizontal perforate partitions 53 and 54. It will be noted that the duct 52 rises above the lowest level 56 of the upper edge of the receptacle.

This apparatus operates in the following manner: The water to be softened is poured into the jug or pitcher from above the chamber 55 and is emptied out according to requirements by the duct 52 and the spout 57.

When it becomes necessary to regenerate the softening material, the receptacle is then filled through the duct 52; the water passes through the chamber 55 and overflows at 56. During its travel the water has to a certain extent raised the softening material, disturbed it and rinsed it, whilst it has, so to speak, spread out the material the particles of which lay have become unduly compressed together through constant use. In this way, the material is in a fitter state to undergo the regenerating action of the salt water, the said action being obtained through a mass of salt placed upon the partition 53, either before or after the filling up with the water; the salt becomes dissolved in the water in the receptacle and the solution, being denser than pure water, falls down through the chamber 55.

Naturally, although only jugs, pails, watering cans and decanters have been illustrated, the invention is applicable to all other vessels of common usage, the essential proviso being that the purifying material shall allow of passage through it on the vessel being filled in which it is desired to soften the water. It will be readily understood that the invention is applicable to all vessels in use at the present time but may likewise give rise to the manufacture of particular vessels specially adapted to the softening of water.

It is moreover self-evident that the invention has only been described and represented here in a merely explanatory but by no means limitative manner and that it could be subjected to various modifications of detail without departing from the spirit thereof.

I claim:

1. Water softening apparatus comprising in combination, a vessel open at the top, permanently closed at the bottom and adapted to contain water softening material and the whole of the water to be softened, a member mounted in said vessel and determining a pouring channel, and two perforate walls extending transversely between said member and the wall of said vessel and forming between them a chamber in which the softening material is accommodated.

2. Water softening apparatus comprising in combination a vessel adapted to contain water softening material and the whole of the water to be softened, said vessel having an imperforate bottom, two perforate walls positioned transversely of said vessel and in spaced relation to each other with the softening material placed between them and a pipe passing down through both said perforate walls which retain the softening material within said vessel, so that softened water is poured out both directly and through said pipe by simply inclining the vessel, while the softened water may stand in the vessel for use when required.

EMMANUEL BREUIL.